United States Patent
Cho

[11] Patent Number: 5,397,953
[45] Date of Patent: Mar. 14, 1995

[54] STATOR FOR DISC TYPE ELECTRIC MOTOR

[75] Inventor: Chahee P. Cho, Portsmouth, R.I.

[73] Assignee: The United States of America as represented by the Secretary of the Navy, Washington, D.C.

[21] Appl. No.: 153,449

[22] Filed: Nov. 17, 1993

[51] Int. Cl.$^6$ ............................................. H02K 1/12
[52] U.S. Cl. ................................. 310/254; 310/216; 310/268
[58] Field of Search ............... 310/268, 216, 254, 259, 310/44, 64; 336/233

[56] References Cited

U.S. PATENT DOCUMENTS

| | | | |
|---|---|---|---|
| 4,719,377 | 1/1988 | Horie et al. | 310/268 |
| 4,820,949 | 4/1989 | Mizobuchi et al. | 310/268 |
| 5,028,830 | 7/1991 | Mas | 310/216 |
| 5,153,475 | 10/1992 | McSparran | 310/254 |
| 5,168,187 | 12/1992 | Baer et al. | 310/268 |
| 5,177,054 | 1/1993 | Lloyd et al. | 310/268 |

Primary Examiner—R. Skudy
Attorney, Agent, or Firm—Michael J. McGowan; Prithvi C. Lall; Michael F. Oglo

[57] ABSTRACT

There is disclosed a stator for a disc type electric motor. The stator comprises an annularly-shaped member of a non-magnetic material, the member having a slotted portion and a non-slotted portion. The slotted portion includes slots extending radially from a central opening of the member to a periphery of the member, the slots being configured to retain electrical wire windings therein. The non-slotted portion is joined with the slotted portion and provides a bottom wall for the slots.

6 Claims, 2 Drawing Sheets

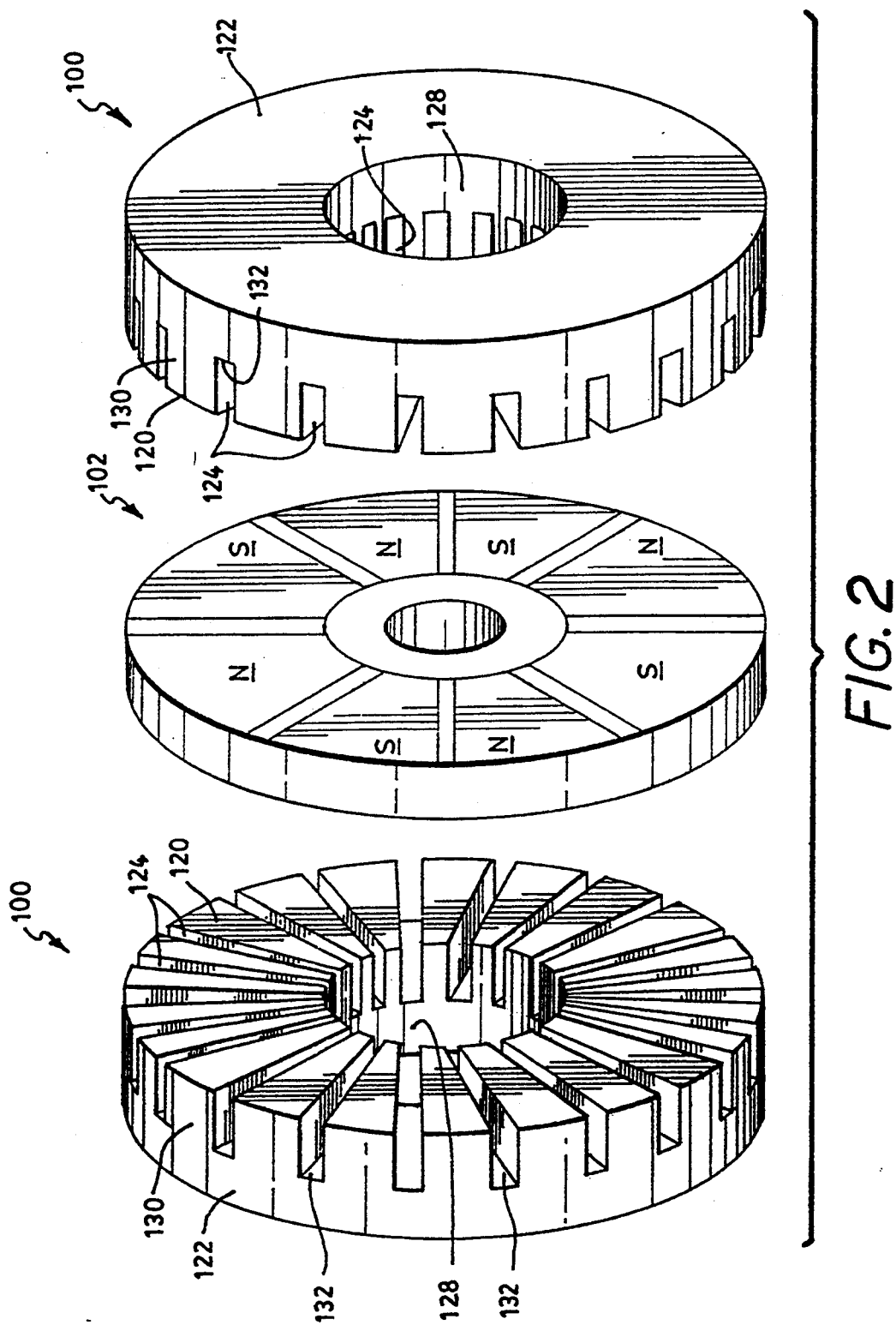

STATOR FOR DISC TYPE ELECTRIC MOTOR

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

This invention relates to electric motors and is directed more particularly to an improved stator for a disc type electric motor.

(2) Description of the Prior Art

Disc type electric motors are known in the art. Such motors typically include two stators and, positioned therebetween, a rotor. Motors of this type are usually of compact size and exhibit, for their size, high power density and high power output. Such motors are often found in products such as camcorders, VCR machines, and CD/CD-ROM machines.

A typical stator for such motors comprises a ferromagnetic body which is provided with a slotted disc portion having radially extending slots facing the rotor. The ferromagnetic stator further includes a non-slotted disc portion outboard of the slotted disc portion and integral therewith or attached thereto. Insulated electrically conductive wires are wound upon the slotted disc portion through the slots therein. The wire windings are energized to form a rotating magnetic field, causing the rotor to rotate.

Increasing the current in the windings increases the magnetic force generated by such stators until magnetic saturation of the stator is reached. Thereafter, increases in winding current does not result in an appreciable increase in magnetic force. Further, alternating current flowing through the windings causes the wires to move repeatedly toward and away from the stator because of the repeated changes in the magnetic field attracting the wire. Such continuous movement, in conjunction with the build-up of heat in and about the windings, results in insulation failure leading to shorts between the winding and the stator.

Accordingly, there is needed an improved stator which is not limited by magnetic saturation, is not as subject to shorting, and provides for improved transfer of heat produced by the windings.

SUMMARY OF THE INVENTION

An object of the present invention is to provide an improved stator for a disc type electric motor, which stator is not limited by magnetic saturation.

A further object of the invention is to provide such a stator wherein the probability of shorting of the windings is substantially reduced.

A still further object of the invention is to provide such a stator having capability for improved transfer of heat produced by the windings.

With the above and other objects in view, as will hereinafter appear, a feature of the present invention is the provision of a stator for a disc type electric motor. The stator comprises a member of a non-magnetic material, the member having an annularly shaped slotted portion and an annularly shaped non-slotted portion. The slotted portion includes slots extending radially from a central opening of the member to a periphery of the member, the slots being open ended at the opening and the periphery and being configured to retain electrical wire windings therein. The non-slotted portion is of inside and outside diameters equal, respectively, to the inside and outside diameters of the slotted portion, the non-slotted portion being joined with the slotted portion and providing a bottom wall for the slots.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent. In the drawings:

FIG. 2 is an exploded perspective view of portions of a disc type electrical motor, shown with stator portions illustrative of an embodiment of the invention.

DESCRIPTION OF THE PREFERRED EMBODIMENT

Figure 1:
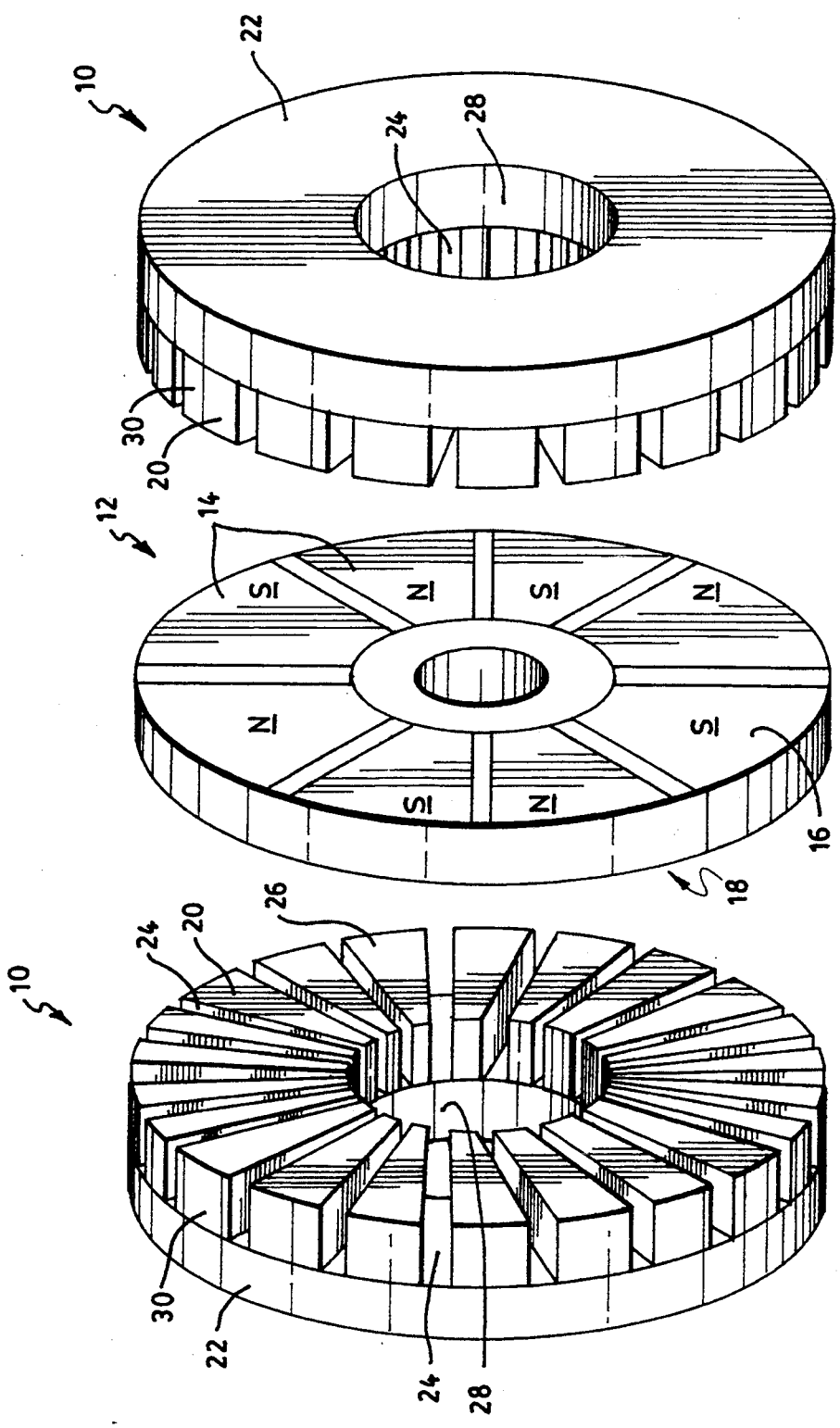
FIG. 1 is an exploded perspective view of portions of a disc type electrical motor of the prior art, showing stator portions thereof.

Referring to FIG. 1, it will be seen that known disc type electric motors typically include a pair of stators 10 and, therebetween, a rotor 12. Rotor 12 includes a plurality of permanent magnets 14 defining, in part, a rotor surface 16. As illustrated in FIG. 1, magnets 14 are arranged such that alternating north and south poles are disposed on rotor surface 16. A similar alternating pattern of magnets is provided on the other rotor surface 18.

Stators 10 are maintained stationary. Each stator 10 includes an annularly shaped slotted portion 20 and an annularly shaped non-slotted portion 22. Slotted portion 20 is provided with a plurality of radially extending slots 24 in a surface 26 facing rotor 12. Slots 24 extend from a central opening 28 of each stator 10 to a periphery 30 thereof, the slots being openended at the opening 28 and the periphery 30. Slots 24 are configured to receive and retain electric wire windings, not shown herein but well known in the art. Stators 10 are made from ferromagnetic material. The winding wires are insulated.

In operation, the wire windings are energized to create a rotating magnetic field, thereby causing rotor 12 to rotate. To a point, increasing current in the windings increases the magnetic forces generated by stators 12. However, a point is reached at which the stator material is magnetically saturated. When the magnetic saturation point is reached, further increases in current do not result in appreciable increases in magnetic forces.

As noted above, another problem common to stators 10 is the localized failure of the winding insulation, causing shorts between the stator and the wire winding. As alternating current flows through the wire, the wire repeatedly moves towards and away from the stator.

Such vibration of the wire causes break down of the wire insulation.

Referring to FIG. 2, there will be seen similar motor components, but including improved stators 100. The motor illustrated in FIG. 2 includes stators 100 for disposition on either side of a rotor 102. Rotor 102 is unchanged from the prior art rotor 12 described above. The improved stators 100 are of non-magnetic, electrically insulative, material having high heat transfer, strength and rigidity properties. The non-magnetic property permits increases in winding current not limited by magnetic saturation of the stator material. The heat transfer characteristic facilitates removal of heat generated by the windings during current flow. The strength and rigidity properties enable the stator to withstand structural loads imposed thereon during motor operation.

Thermoconductive dielectric materials found suitable for the new stators 100 are ceramic composites, particularly a ceramic composite using silicon carbide, such as SG-SC, manufactured by Smart Ceramics, Inc. of Woburn, Mass. Other ceramic composites found useful include, respectively, copper and aluminum. Heat conductivity of copper particles in a ceramic material exceeds the conductivity of aluminum or silicon carbide, and the heat conductivity of aluminum exceeds that of silicon carbide. Thus, in some applications the use of copper or aluminum in the ceramic composite may be preferred to silicon carbide. On the other hand, the electrical insulation properties are in the reverse order; that is, the best insulator of the three preferred materials is silicon carbide, followed by aluminum, followed by copper.

Based on the combination of heat conduction, electrical insulation, cost, and facility for mixing with ceramic material, the most suitable material appears to be silicon carbide. Composited with ceramic material, silicon carbide provides the required properties of being non-magnetic and electrically insulative, having acceptable heat transfer properties and having the required properties of strength and rigidity.

Each stator 100 includes an annularly shaped slotted portion 120 including slots 124 extending radially from a central opening 128 of the stator to a periphery 130 of the stator. Slots 124 are open-ended at the opening 128 and the periphery 130 of the stator, and are configured to receive and retain electrically conductive windings (not shown).

Each stator 100 further includes an annularly shaped non-slotted portion 122. The inside and outside diameters of the non-slotted portion are equal to, and coincident with, respectively, the inside and outside diameters of slotted portion 120. Non-slotted portion 122 is joined with slotted portion 120 and, in the illustrated embodiment, is integral therewith. Non-slotted portion 122 provides a bottom wall 132 for slots 124.

The new stator described and shown herein provides for substantial improvement over the ferromagnetic stators of the prior art by permitting increases in the magnetic field generated by the stator and by increasing current flow through the stator windings without limitation based upon magnetic saturation. Because the stator is of non-magnetic material, current flow does not cause the wire to vibrate and rub the stator, thereby providing the additional benefit of substantial reduction in failure of wire insulation and shorting.

While there are illustrated components of a disc type electric motor having two stators and one rotor, it is known to provide such motors with any number of rotors and stators, so long as there is at least one stator for each rotor.

It is to be understood that the present invention is by no means limited to the particular construction herein disclosed and/or shown in the drawings, but also comprises any modifications or equivalents within the scope of the claims.

What is claimed is:

1. A stator for a disc electric motor, said stator comprising:
   a member of non-magnetic dielectric, thermoconductive ceramic composite material, said member having an annularly shaped slotted portion and an annularly shaped non-slotted portion;
   said slotted portion including slots extending radially from a central opening of said member to a periphery of said member, said slots being open ended at said opening and said periphery and configured to retain electrical wire windings therein; and
   said non-slotted portion being of inside and outside diameters equal, respectively, to inside and outside diameters of said slotted portion, said non-slotted portion being joined with said slotted portion, and providing a bottom wall for said slots.

2. The stator in accordance with claim 1, wherein said ceramic composite material is selected from a group of materials consisting of silicon carbide, aluminum, and copper.

3. The stator in accordance with claim 1, wherein said ceramic composite material includes silicon carbide.

4. The stator in accordance with claim 1, wherein said ceramic composite material includes aluminum.

5. The stator in accordance with claim 1, wherein said ceramic composite material includes copper.

6. The stator in accordance with claim 1, wherein said non-slotted portion is integral with said slotted portion.

* * * * *